(12) United States Patent
Nonomura et al.

(10) Patent No.: US 6,284,171 B1
(45) Date of Patent: Sep. 4, 2001

(54) BLOW MOLDING PROCESS

(75) Inventors: Akira Nonomura; Kenji Ichinohe; Ken-ichi Ootani, all of Tochigi (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/147,188

(22) PCT Filed: Feb. 25, 1997

(86) PCT No.: PCT/JP97/00539

§ 371 Date: Oct. 26, 1998

§ 102(e) Date: Oct. 26, 1998

(87) PCT Pub. No.: WO98/38027

PCT Pub. Date: Sep. 3, 1998

(51) Int. Cl.[7] .................................................. B29C 49/64
(52) U.S. Cl. .......................... 264/40.3; 264/523; 264/540; 264/526; 264/528; 425/526
(58) Field of Search .................................. 264/528, 540, 264/523, 40.3, 526; 425/522, 526, 535

(56) References Cited

U.S. PATENT DOCUMENTS

| | | | |
|---|---|---|---|
| 3,233,416 | * 2/1966 | Rainwater et al. | 62/5 |
| 3,338,998 | * 8/1967 | Settembrini | 264/526 |
| 3,666,849 | * 5/1972 | Williams et al. | 264/40.3 |
| 3,888,961 | * 6/1975 | Schonewald | 264/528 |
| 5,565,165 | * 10/1996 | Matsuhashi | 265/526 |

FOREIGN PATENT DOCUMENTS

| | | |
|---|---|---|
| 3-13313 | 1/1991 | (JP) . |
| 3-222714 | 10/1991 | (JP) . |
| 5-104615 | 4/1993 | (JP) . |

* cited by examiner

Primary Examiner—Jan H. Silbaugh
Assistant Examiner—Suzanne E McDowell
(74) Attorney, Agent, or Firm—Oblon, Spivak, McClelland, Maier & Neustadt, P.C.

(57) ABSTRACT

A blow molding process in which a gas is blown into a parison within a mold to inflate the parison, the parison makes intimate contact with a mold shaping portion to form a hollow molded product, and the gas within the hollow molded product is discharged for cooling, the blow molding process including setting an internal gas pressure of the hollow molded product to 5 to 8 kgf/cm$^2$; and discharging a gas satisfying an expression, $F \geq 10 \times W$. while blowing, wherein F is a gas flow rate (Nl/min) and W is a hollow molded product weight (g).

6 Claims, 6 Drawing Sheets

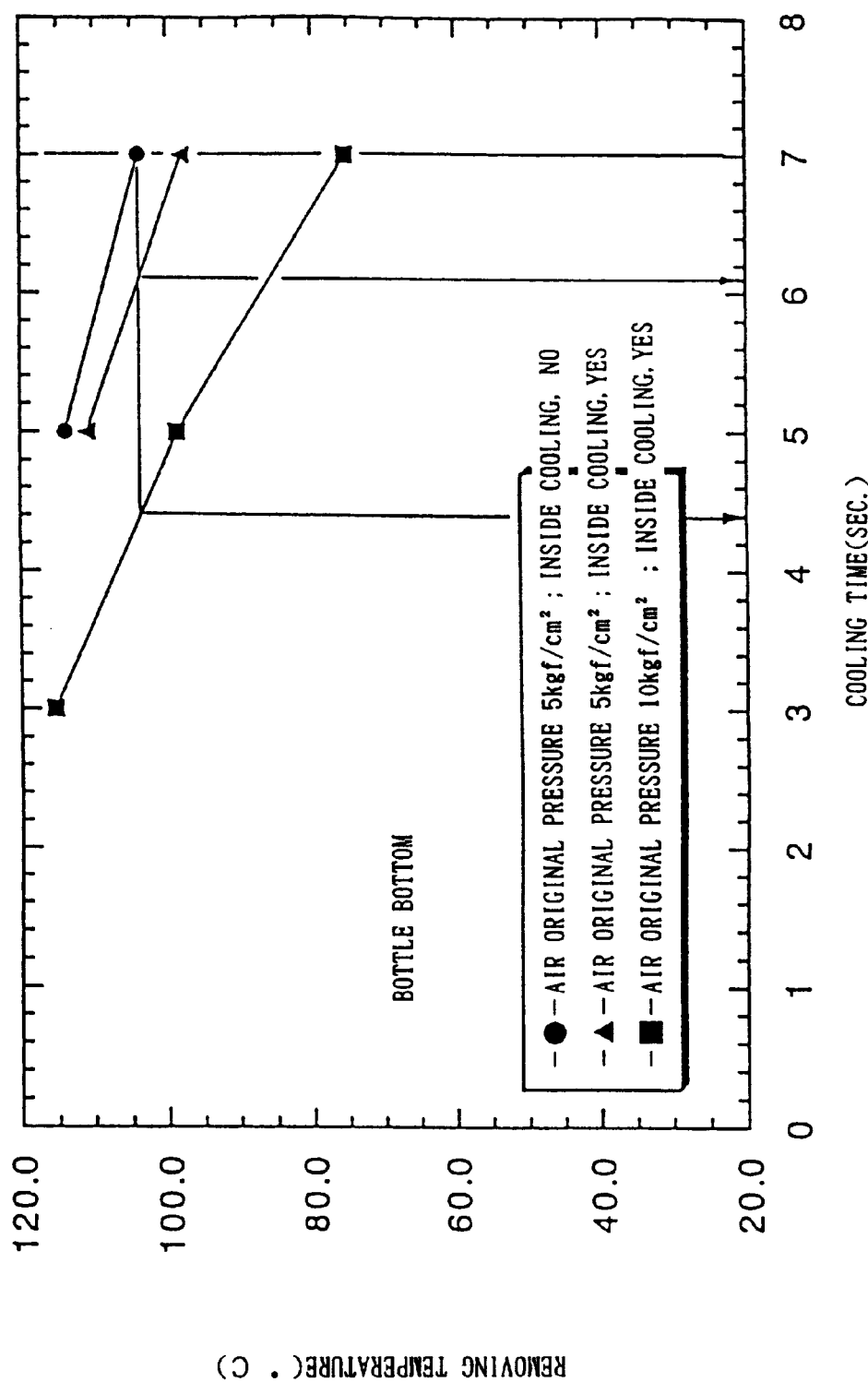

BLOW MOLDING PROCESS

BACKGROUND OF THE INVENTION

1. Field of the Invention

This invention relates to a blow molding process of a plastic product, and more particularly to a blow molding process in which a cooling is performed from the insides of a mold and a hollow molded product.

2. Description of the Invention

In a blow molding, after a sleeve-like molten resin called a parison extruded from an extruder is sandwiched between mold halves of a split mold, air is blown into the parison to inflate it so that a configuration of the mold cavity is applied to the inflated parison, and then the parison is cooled and hardened within the mold to obtain a desired hollow molded product.

In the blow molding, although the outside of a hollow molded product such as a bottle, or the like is cooled because it contacts the mold through which a cold water circulates, the inside of the hollow molded product is not cooled because the inside is in a heat insulated state. In case the inside of the hollow molded product is not cooled as just discussed, the pressure inside the hollow molded product becomes an original pressure of air to be introduced and the hollow molded product can be cooled by being intimately contacted with the mold. However, since only the cooling effect is obtained from the mold, cooling efficiency is bad.

A cooling method is disclosed in Japanese Patent Laid-Open Publication (Tokkai) No.3(1991)-13313, in which the pressure inside the hollow molded product is, in order to reduce the time for cooling, maintained at a prescribed pressure level and then air is discharged while blowing air into the interior of the hollow molded product, so that the hollow molded product is cooled also from the inside.

Japanese Patent Laid-Open Publication (Tokkai) No.3 (1991)-222714 discloses a device in which an air blowing tube for introducing air, and a discharge tube for discharging air within a hollow molded product are, in order to enhance the inside cooling efficiency, located away from each other so that the air flows the entire hollow molded product. Further, Japanese Patent Laid-Open Publication (Tokkai) No.5(1993)-104615 discloses a device in which an air blowing port is rotated under air pressure so that the air is blown to the entire hollow molded product.

However, in case air is discharged while blowing air into the hollow molded product, the pressure within the hollow molded product becomes lower than the original pressure of the air. For this reason, the force for urging the parison against the mold becomes small compared with a case where no inside cooling is performed, and the cooling effect from the mold is lower than in the case where no inside cooling is performed.

That is, in the conventional inside cooling process, the cooling effect from the inside is available but on the other hand, the cooling effect from the mold is lowered. As a consequence, it is unable to obtain a sufficient cooling effect.

SUMMARY OF THE INVENTION

It is, therefore, an object of the present invention to provide a blow molding process in which the cooling effect from a mold and the cooling effect from the inside of a hollow molded product are effectively obtained and therefore, the hollow molded product can be blow molded under a large cooling effect.

As a result of a hard study for achieving the above object, the present applicant found out the fact that by setting the inside gas pressure of the hollow molded product within a certain range, the cooling effect from both the inside and outside of the hollow molded product can be efficiently and sufficiently exhibited without lowering the cooling effect from the mold and by cooling the inside with a prescribed quantity or more of cooling gas such as air, or the like.

The present invention has been made based on the above finding. According to the present invention, there is provided in a blow molding process in which a gas is blown into a parison within a mold to inflate the parison so that the parison is intimately contacted with a mold shaping portion to form a hollow molded product, and the gas within the hollow molded product is discharged for the purpose of cooling, the blow molding process being characterized in that an internal gas pressure of the hollow molded product is set to 5 to 8 kgf/cm$^2$ (G) and the gas satisfying the expression $F \geq 10 \times W$ where F is a gas flow (N 1/min) and W is a hollow molded product weight (g) is discharged while blowing.

The inside gas pressure of the hollow molded product and the flow rate of the gas are defined within the above-mentioned ranges based on the following test result.

In FIG. 2, the temperature for removing the hollow molded product is measured without performing an inside cooling but by changing the original pressure (blowing pressure) of air. The molding conditions are as follows.

| | |
|---|---|
| Bottle capacity | 200 ml |
| Bottle weight | 20 g |
| Resin | high density polyethylene (HDPE) |
| Resin thickness | body portion 0.5 to 1.5 mm |
| | bottom portion 1 to 3 mm |
| Blowing time | 6 sec. |
| Discharging time | 1 sec. |
| Blowing air temperature | 20° C. |
| Mold cooling water temperature | 17° C. |

As shown in FIG. 2, the lower the pressure within the bottle is, the more the force for urging the parison against the mold is decreased. For this reason, the effective contact area with the mold is reduced. Further, since the molded product is contracted with the progress of cooling, a gap between the molded product and the mold is enlarged. As seen, when the original pressure of air is decreased, the cooling effect from the mold tends to be decreased and the temperature for removing is increased.

The present applicant found out from this result the fact that if the original pressure (blowing pressure) of air is set to 5 to 8 kgf/cm$^2$ (G) or more, the cooling effect from the mold becomes constant. The reason seems to be as follows. If the force for urging the resin against the mold is 5 to 8 kgf/cm$^2$ (G) or more, the effective contact area of a molten resin with the mold is unchanged and the molded product is not easily removed from the mold even if the molded product is contracted. As a consequence, the cooling effect from the mold becomes constant.

In FIGS. 3 and 4, in case the inside cooling is performed, when the original pressure of air is 5 kgf/cm$^2$ (G) or 10 kgf/cm$^2$ (G) and the removing temperature is measured by varying the pressure within the bottle. In FIGS. 3 and 4, in case the pressure within the bottle is 5 kgf/cm$^2$ (G) when the original pressure of air is 5 kgf/cm$^2$ (G), it indicates a state that no inside cooling is performed. In case the pressure within the bottle is 10 kgf/cm$^2$ (G) when the air original pressure is 10 kgf/cm$^2$ (G), it indicates a state that no inside cooling is performed.

First, let's review the case where the original pressure of the bottle is 5 kgf/cm² (G).

Up to 2 to 5 kgf/cm² (G) of the pressure within the bottle, the removing temperature is decreased because the cooling effect from the inside overcomes the decrease of the cooling effect from the mold. For example, in case the pressure within the bottle is set to 4 kgf/cm² (G) and the flow rate of the air is set to 100 N1/min, the removing temperature is lowered by 10 to 15° C., compared with the case where no inside cooling is performed.

If the pressure within the bottle is lowered to 2 kgf/cm² (G) or less, an apparent removing temperature is not changed in spite of the fact that air of the flow rate of 200 to 230 N1/min flows because the cooling effect from the inside is offset by the decrease of the cooling effect from the mold. In this case, the removing temperature is lowered by 15° C. compared with the case where no inside cooling is performed.

However, in case the air was flowed at a flow rate of 300 N1/min by increasing the original pressure of air to 10 kgf/cm² (G) while maintaining the pressure within the bottle at the level of 6 kgf/cm² (G), the removing temperature could be lowered by 20° C. to 30° C. compared with the case where no inside cooling was performed.

It should be noted, however, that in case the pressure within the bottle is maintained at the level of 4 kgf/cm² (G), the removing temperature is not changed even if air of the flow rate of 360 N1/min is flowed because the cooling effect from the mold is lowered, thus resulting in wasteful use of air.

That is, by blowing a large amount of air into the bottle and discharging the air therefrom in the state that the pressure within the mold is set such that the cooling effect from the mold becomes maximum, a large cooling effect can be obtained by using air efficiently.

Next, the flow rate of air necessary for cooling the inside is reviewed.

FIG. 5 shows a relation between the air flow rate and the temperature difference between the blowing air and the discharging air of FIGS. 3 and 4.

The heat transmitting speed from the resin to the air in case the inside cooling by air is performed, is determined by a heat transfer coefficient of the air from the resin and the difference between the surface temperature of the resin and the air temperature.

Accordingly, if the air flow rate is increased, the boundary film in the nearby area of the resin surface is reduced in thickness and the heat transmitting amount from the resin to the air is increased to greatly increase the degree of the increase of air temperature. However, since the difference between the resin surface temperature and the air temperature is also decreased, the degree of increase of the air temperature is generally constant at 25° C., i.e., the discharged air temperature becomes generally constant at 45° C.

A specific decrease of the removing temperature due to specific seconds for performing the inside cooling depends on the thickness of the hollow molded product, the capacity of the hollow molded product, etc. With respect to a bottle having a thickness up to 0.5 to 3 mm, the removing temperature in case the inside cooling is performed for about 7 seconds is lower by 20 to 30° C. than the case where no inside cooling is performed.

From the foregoing, the required flow rate of air is reviewed based on the heat balance between the air and the resin.

The heat quantity carried away by air from the system is as follows.

| Specific heat of air | 0.25 cal/g-° C. |
| Air density | $1.2 \times 10^{-3}$ g/cm³ |
| Air temperature increase amount | 25° C. |
| Mold inside cooling time | 7 sec. |
| Air flow rate | F N1/min, |

$$0.25 \text{ cal/g-}°\text{C.} \times 1.2 \times 10^{-3} \text{ g/cm}^3 \times F \text{ N1/min} \times 25°\text{ C.} \times 1000 \text{ cm}^3/1 \times 7 \text{ s} \div 60 \text{ s/min} \quad \text{expression (1)}$$

On the other hand, the heat quantity taken away from the resin is as follows.

| Specific heat of air | 0.5 cal/g-° C. |
| Weight of the bottle | W g |

In case removing temperature of the bottle by inside cooling is lowered by 20° C.

$$0.5 \text{ cal/g-}°\text{C.} \times W \text{ g} \times 20°\text{ C.} \quad \text{expression (2)}$$

From the foregoing, because the expression (1) and the expression (2) is equal, the required flow rate of air is as follows.

$$F \geq 10 \times W \quad \text{expression (3)}$$

For example, in this case, since W=20 g, thus F≧200 N1/min. In FIG. 5, if F≧200 N1/min, it is known that the amount of temperature increase of air becomes constant and the ability of air per unit volume for taking away the heat from the resin becomes maximum.

In the conventional blow molding, the original pressure of the air was 4 to 7 kgf/cm² (G). Therefore, in case the inside cooling is performed, when the internal gas pressure of the bottle was set to 5 to 8 kgf/cm² (G), a sufficient inside cooling effect could not be obtained because the flow rate of air was too small.

On the other hand, when a large quantity of air was blown and discharged, the cooling effect from the mold was degraded because the pressure within the bottle was lowered.

When the original pressure of air of 4 to 7 kgf/cm² (G) was used conventionally, it was utterly impossible to flow such a large quantity of air as able to satisfy the expression (3) by setting the gas pressure within the bottle to 5 to 8 kgf/cm² (G).

Therefore, for example, by increasing the original pressure of air to 10 kgf/cm² (G), a large cooling effect can be obtained from both the inside and the outside of the bottle efficiently by flowing air of the flow rate satisfying the expression (3) when the pressure within the bottle is 5 to 8 kgf/cm² (G). Therefore, the removing temperature can be lowered.

In the present invention, the air having a room temperature of 20° C. is used. However, in case a cooled air is used, the removing temperature can be further lowered.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 6 is a characteristic chart showing the relation between the cooling time and the removing temperature.

DETAILED DESCRIPTION OF THE PREFERRED EMBODIMENTS

Figure 1:
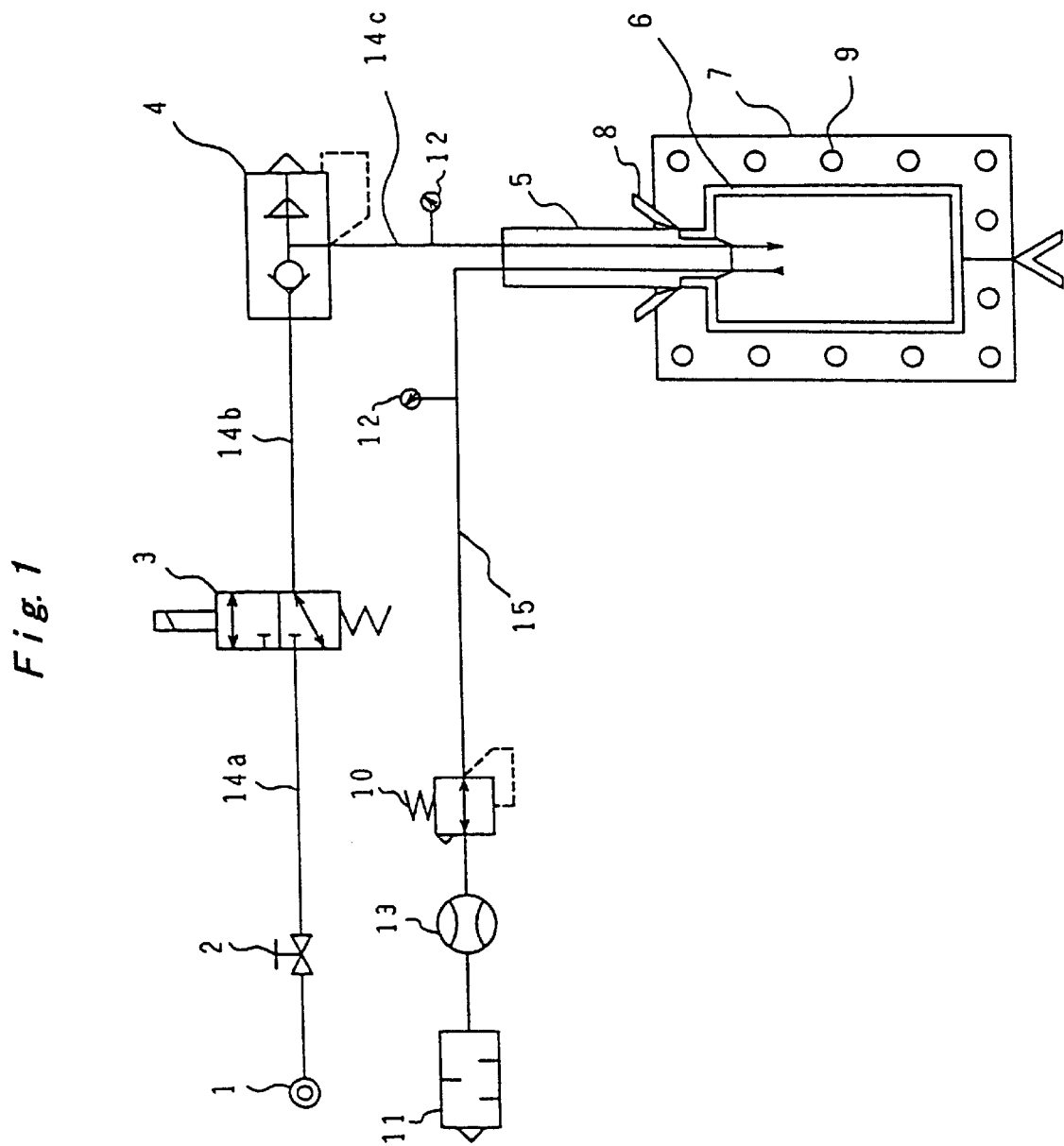
FIG. 1 is an air circuit diagram in an inside cooling device used for carrying out a blow molding process of the present invention.
Figure 2:
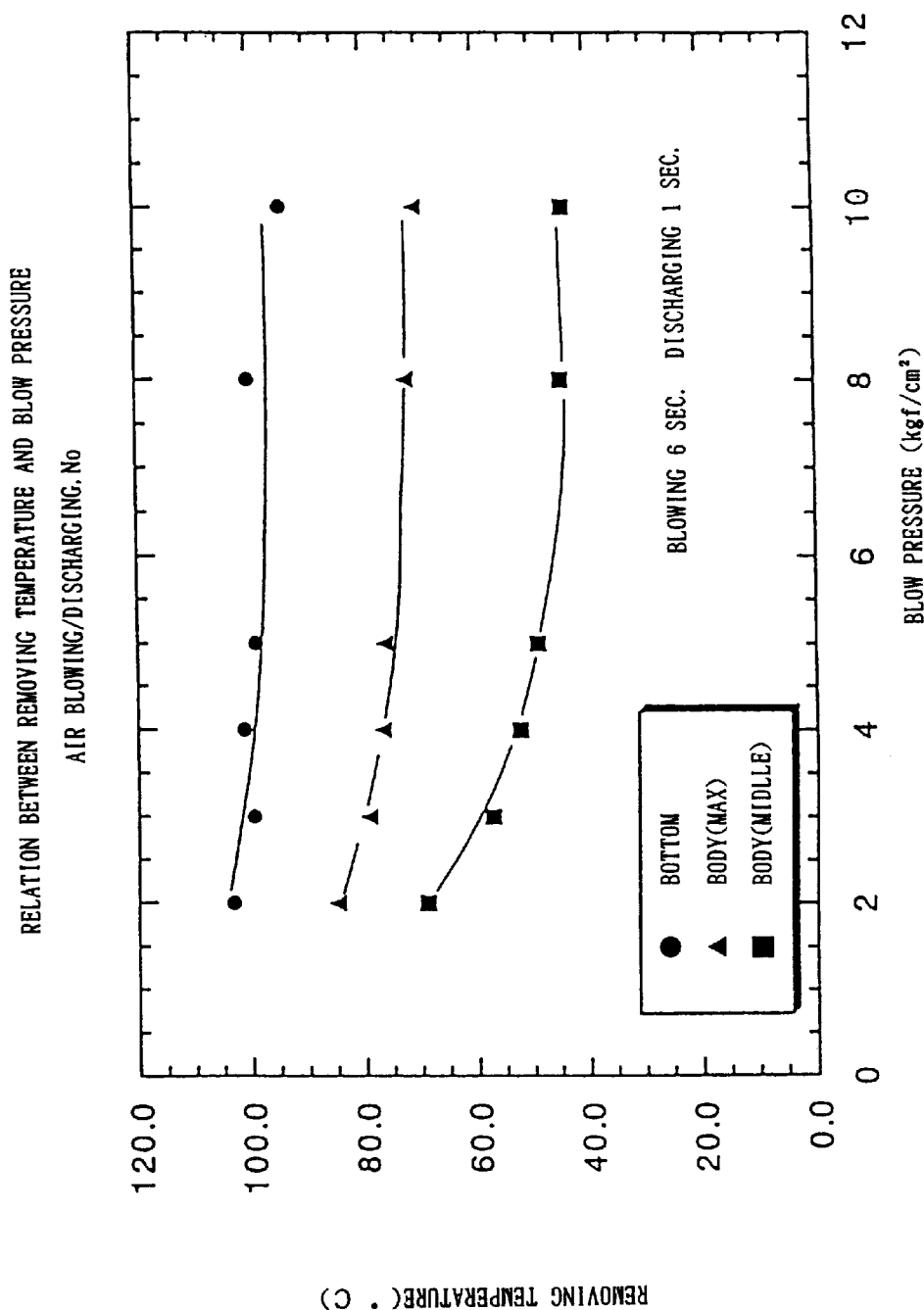
FIG. 2 is a characteristic chart showing a relation between the removing temperature and the blowing pressure when no air is blown or discharged.
Figure 3:
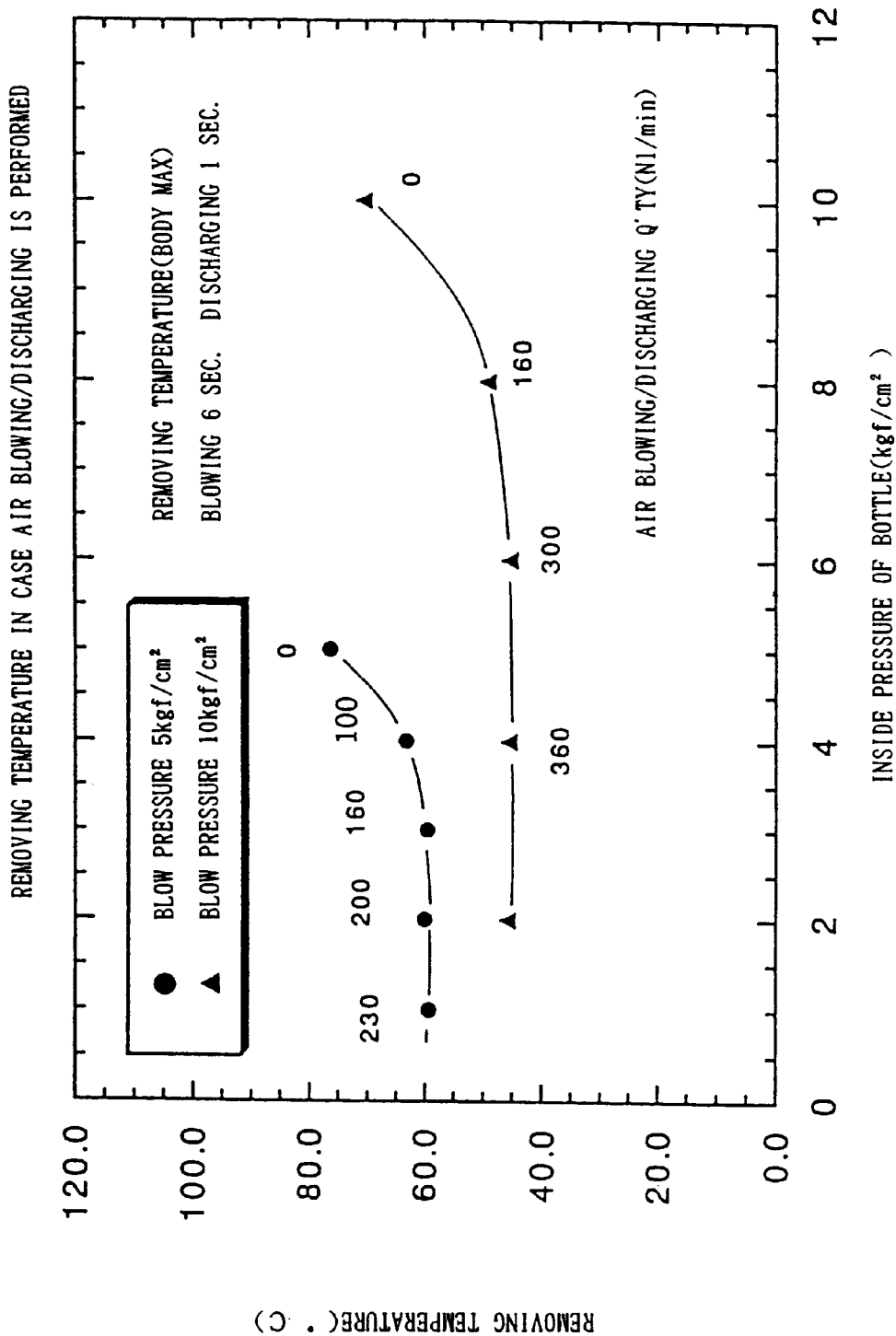
FIG. 3 is a characteristic chart showing a relation between the pressure within the bottle and the removing temperature at the body portion of the bottle when air is blown or discharged.
Figure 4:
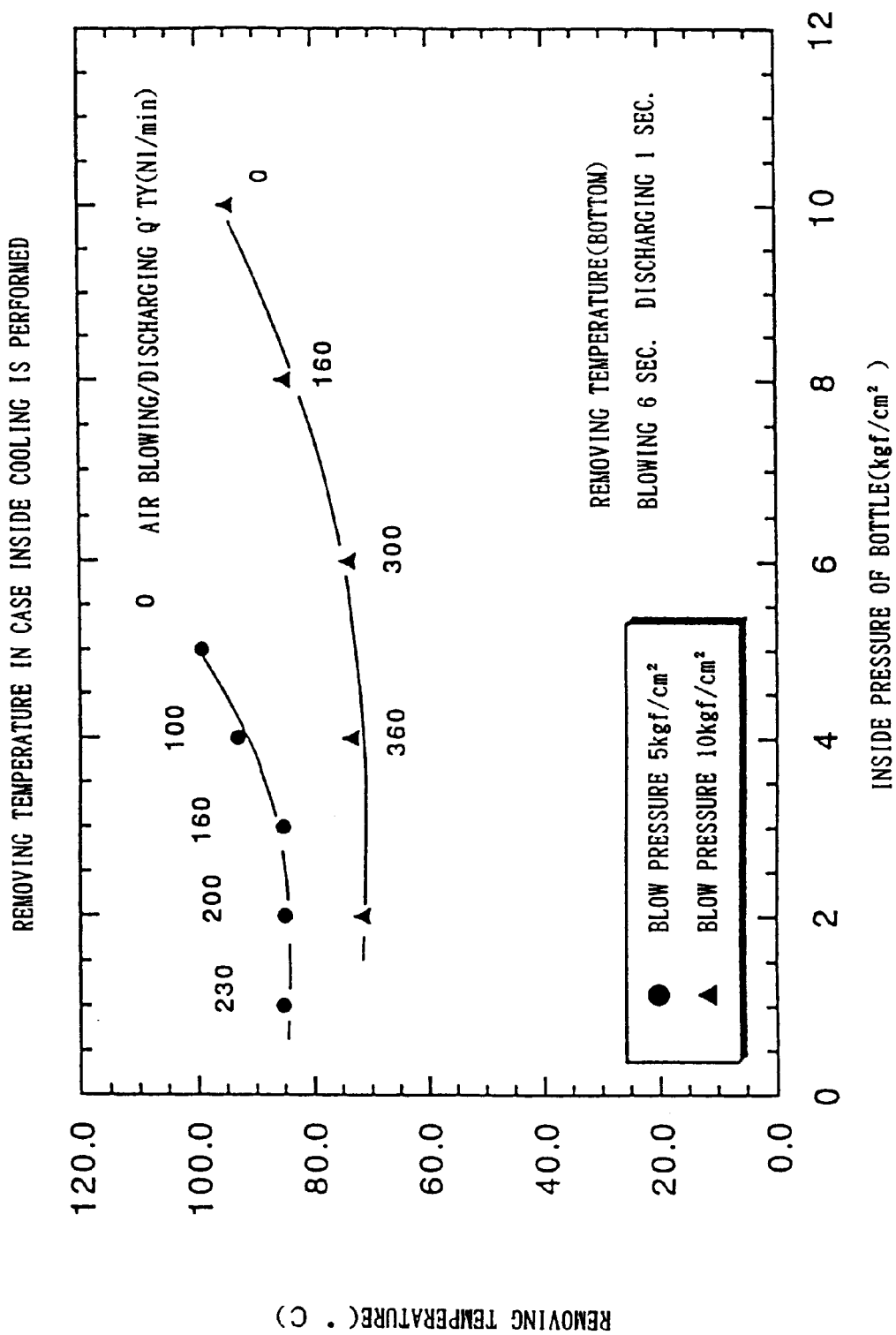
FIG. 4 is a characteristic chart showing a relation between the pressure within the bottle and the removing temperature at the bottom portion of the bottle when air is blown or discharged.
Figure 5:
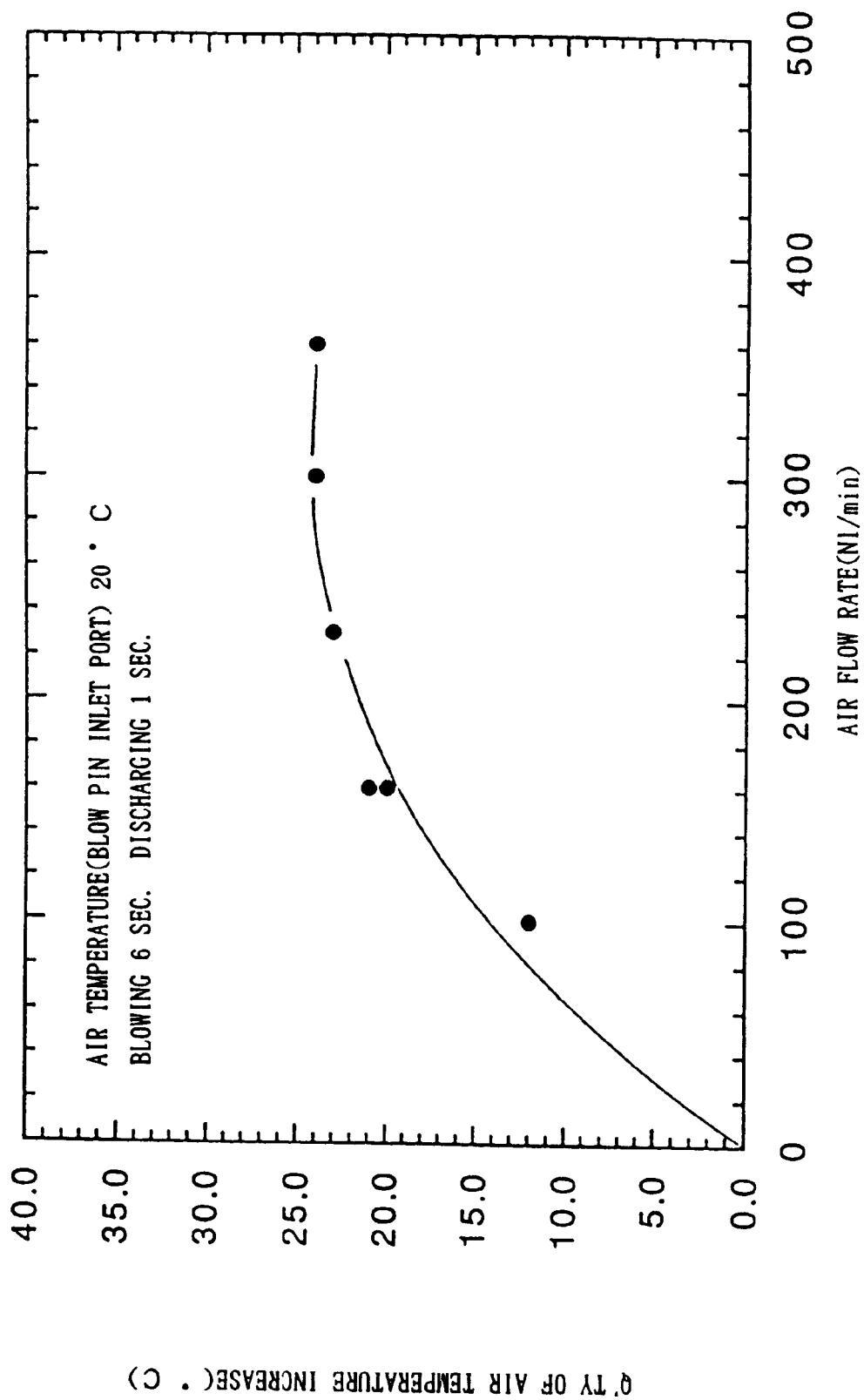
FIG. 5 is a characteristic chart showing the relation between the air flow rate and the quantity of temperature increase of air.

The preferred embodiments will now be described with reference to the accompanying drawings, wherein like reference numerals designate corresponding or identical elements throughout the various drawings.

One embodiment of a blow molding process of the present invention will be described hereinafter with reference to the drawings.

FIG. 1 is an air circuit diagram of an inside cooling device used for carrying out the blow molding process of this embodiment.

As shown in FIG. 1, the blow molding process of this embodiment is a blow molding process in which a gas is blown into a parison within a mold 7 to inflate the parison so that the parison is intimately contacted with a mold shaping portion to form a hollow molded product 6, and the gas is discharged from the interior of the hollow molded product 6 for the purpose of cooling.

The blow molding process of this embodiment is described in more detail.

An air circuit shown in FIG. 1 chiefly comprises a blowing side path for blowing gas such as air, or the like into a parison, and a discharging side path for discharging the gas blown into the parison. The bowing side path comprises a first blowing side path 14a, a second blowing side path 14b, and a third blowing side path 14c disposed over the entire distance between an air supply source 1 and a blow pin 5 hammered into a nozzle portion 8 of the mold 7.

A solenoid valve 3 is provided between the first blowing side path 14a and the second blowing side path 14b. A quick exhaust 4 for reducing the time for discharging air within the hollow molded product 6 and air within a piping is provided between the second blowing side path 14b and the third blowing side path 14c. A stop valve 2 for preventing entry of air is provided between the air supply source 1 and the solenoid valve 3.

The discharging side path comprises a discharge path 15 disposed over the entire distance between the blow pin 5 and a silencer 11. This discharge path 15 is provided at a location near the silencer 11 with a relief valve 10 for keeping pressure within the hollow molded product 6 in a prescribed range.

Pressure sensors 12 are provided each on an intermediate part of the third blowing side path 14c and on an intermediate part of the discharge path 15. Further, an air flow meter 13 is provided between the relief valve 10 and the silencer 11.

The blow molding is performed in the following manner, using the blow molding machine provided with the inside cooling device.

First, a sleeve-like molten resin called a parison (not shown) extruded from an extruder is sandwiched between mold halves of the split mold 7, and then cut with a cutter (not shown). Thereafter, the blow pin 5 is hammered into the nozzle portion 8 of the mold 7. The mold 7 is provided with a plurality of cooling water circulating cavities 9 for circulating cold water.

Then, the solenoid valve 3 is opened and the air having an original pressure of 10 kgf/cm$^2$ (G) is blown into the parison from a distal end of the blow pin 5. As a consequence, the parison is inflated and urged against the mold shaping portion to form the hollow molded product 6. When the pressure within the hollow molded product 6 reaches a preset value of the relief valve 10, the air blown into the hollow molded product 6 is discharged from the silencer 11 by the relief valve 10 via the discharging side path 15. In this invention, the pressure of the relief valve 10 is set to 5 to 8 kgf/cm$^2$ (G).

About the pressure within the hollow molded product 6, the opening degree of a flow regulator such as a valve, or the like is regulated such that the pressure sensors 12 each provided on the first blowing side path 14a, the second blowing side path 14b, the third blowing side path 14c, or the discharging side path 15 indicate 5 to 8 kgf/cm$^2$ (G).

After the air is discharged for a prescribed time while blowing, the solenoid valve 3 is closed. When the pressure within the second blowing side path 14b is lowered, the quick exhaust 4 is actuated due to pressure difference between the second blowing side path 14b and the third blowing side path 14c, and the air present in the third blowing side path 14c, the hollow molded product 6 and the discharging side path 15 is discharged.

After the pressure within the hollow molded product 6 is lowered to the atmospheric pressure, the blow pin 5 hammered into the nozzle portion 8 of the mold 7 is separated from the mold 7 and the mold 7 is opened for allowing the hollow molded product 6 to be removed therefrom.

EXAMPLE

Next, a bottle was actually molded using the above inside cooling device. The molding conditions are as follows.

| | |
|---|---|
| Bottle capacity | 200 ml |
| Bottle weight | 20 g |
| resin | high density polyethylene (HDPE) |
| resin thickness | body portion: 0.5 to 1.5 mm, bottom portion: 1 to 3 mm |
| air blowing temperature | 20° C. |

FIG. 6 shows results of the cooling time (blowing time+ discharging time) and the removing temperature at the bottom portion in case no inside cooling is performed, in case the inside cooling is performed by setting the original air pressure to 5 kgf/cm$^2$ (G), the pressure within the bottle to 4 kgf/cm, the air flow rate to 100 Nl/min, and in case the inside cooling is performed by setting the original pressure of air to 10 kgf/cm$^2$ (G), the pressure within the bottle to 6 kgf/cm$^2$ (G), and the air flow rate to 300 Nl/min.

By this, in comparison with the case where no inside cooling is performed, in case the inside cooling is performed by setting the original pressure of air to 5 kgf/cm² (G), the pressure within the bottle to 4 kgf/cm2 (G), and the air flow rate to 100 Nl/min, the cooling time is shortened by about 15% (in case the removing temperature of 105° C. is served as a reference temperature, shortened from 7 sec. to 6.1 sec.). In case the inside cooling is performed by setting the original pressure of air to 10 kgf/cm² (G), the pressure within the bottle to 6 kgf/cm² (G), and the air flow rate to 300 Nl/min, the cooling time is shortened proximately by 40% (shortened from 7 sec. to 4.4 sec).

As apparent from the test result, in the state where the gas pressure within the hollow molded product is 5 to 8 kgf/cm² (G), by discharging the air of the flow rate satisfying the above expression (3), i.e., in the above test, air flow rate of 200 Nl/min or more, while blowing, the cooling effect from the mold can be maximized. Moreover, the cooling from the inside of the hollow molded product can also be performed efficiently and the cooling time can be shortened extensively.

The blow molding process of the present invention is not limited to the above embodiment but can be appropriately be changed without departing from the gist of the present invention. For example, in the above embodiment, the relief valve 10 is used as the pressure regulating valve. It should be noted, however, that by using a flow regulator such as a valve, or the like, the pressure within the hollow molded product 6 can likewise be regulated. In that case, the air blown into the parison is gradually discharged immediately after it is blown.

Industrial Applicability

As apparent from the hereinbefore description, according to the blow molding process of the present invention, the cooling effect from the mold can be maintained at its maximum level by maintaining the inside gas pressure of the hollow molded product to 5 to 8 kgf/cm² (G). In addition to this inside gas pressure, by discharging air of the flow rate satisfying the expression $F \geq 10 \times W$ [where F: gas flow rate (Nl/min) and W: hollow molded product weight (g)] while blowing, a large cooling effect can be obtained from the inside of the hollow molded product.

Therefore, according to the present invention, a sufficient cooling effect can be derived by the mold from the outside of the hollow molded product and by air from the inside of the hollow molded product. Accordingly, a large cooling effect can be obtained without inefficiently using air. Thus, productivity can be enhanced by extensively shortening the cooling time.

Obviously, numerous modifications and variations of the present invention are possible in light of the above teachings. It is therefore to be understood that, within the scope of the appended claims, the invention may be practiced otherwise than as specifically described herein.

What is claimed is:

1. A blow molding process in which a gas is blown into a parison within a mold to inflate the parison, the parison makes intimate contact with a mold shaping portion to form a hollow molded product, and the gas within the hollow molded product is discharged for cooling, said blow molding process comprising:

setting an internal gas pressure of the hollow molded product to 5 to 8 kgf/cm²; and discharging a gas satisfying an expression, $F \geq 10 \times W$, while blowing, wherein F is a gas flow rate (Nl/min) and W is a hollow molded product weight (g).

2. The blow molding process according to claim 1, further comprising:

providing a cooling device configured to cool an interior of the hollow molded product, the cooling device having an air circuit including at least one blowing side path and at least one discharging side path;

blowing the gas into the parison through the at least one blowing side path; and discharging the gas blown into the parison from the at least one discharging side path.

3. The blow molding process according to claim 1, further comprising:

providing a cooling device configured to cool an interior of the hollow molded product, the cooling device having an air circuit including a first blowing side path, a second blowing side path and a third blowing side path between an air supply source and a blow pin hammered into a nozzle portion of the mold, and a discharging side path disposed between the blow pin and a silencer at a location near the silencer with a relief valve configured to keep pressure within the hollow molded product in a prescribed range;

blowing the gas into the parison through the first, second and third blowing side paths; and discharging the gas blown into the parison from the discharging side path.

4. The blow molding process according to claim 3, further comprising:

providing a solenoid valve between the first blowing side path and the second blowing side path;

providing a quick exhaust between the second blowing side path and the third blowing side path, the quick exhaust being configured to reduce time for discharging air within the hollow molded product and air within a piping; and providing a stop valve between the air supply source and the solenoid valve, the stop valve being configured to prevent entry of air.

5. The blow molding process according to claim 4, further comprising:

providing a pressure sensor on an intermediate part of the third blowing side path and on an intermediate part of the discharge path; and providing an air flow meter between the relief valve and the silencer.

6. A blow molding process comprising:

setting an internal gas pressure of a hollow molded product to 5 to 8 kgf/cm²; and blowing a gas into a parison within a mold to inflate the parison while discharging the gas according to an expression, $$F \geq 10 \times W,$$

wherein F is a gas flow rate (Nl/min) and W is a hollow molded product weight (g).

* * * * *